March 24, 1953  R. E. STEELE ET AL  2,632,227
METHOD AND APPARATUS FOR THE RELEASE
OF CERAMIC WARE FROM POROUS MOLDS
Filed Jan. 12, 1951  2 SHEETS—SHEET 2
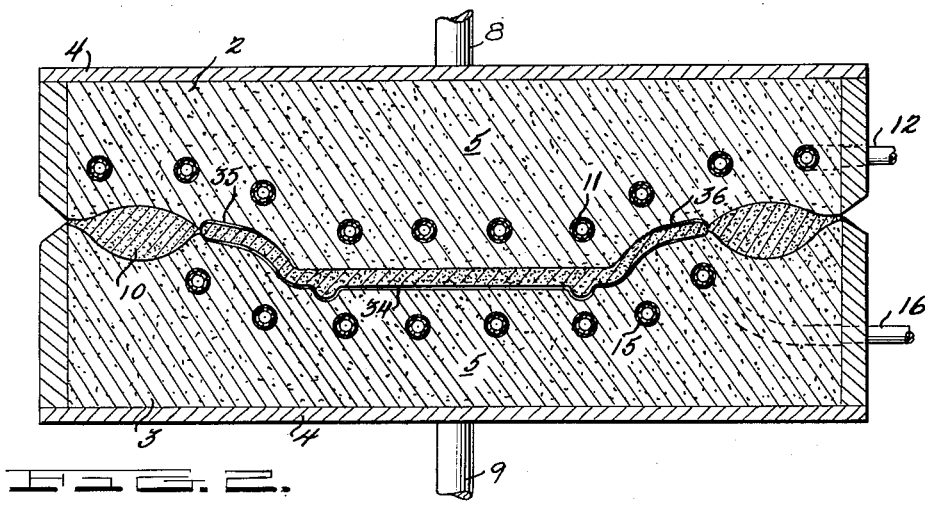
FIG. 2.
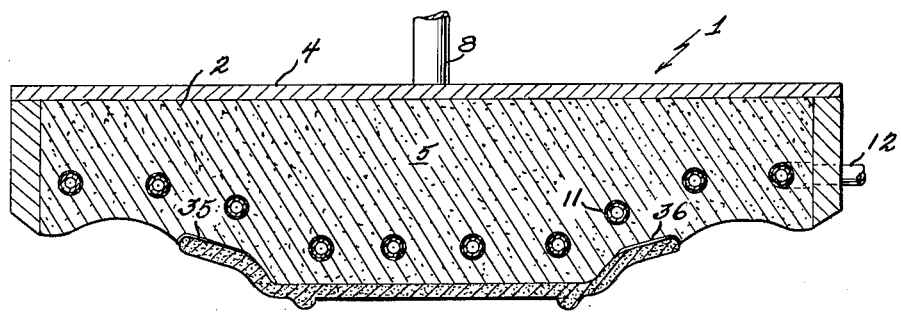
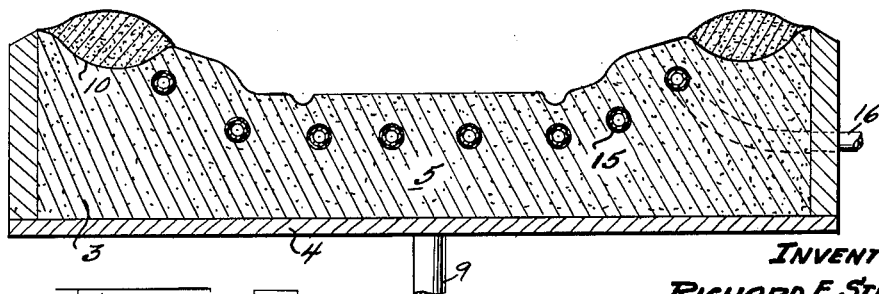
FIG. 3.
INVENTORS
RICHARD E. STEELE
JOHN F. BRYER
By
Semmes, Keegin, Robinson & Semmes
ATTORNEYS Patented Mar. 24, 1953

2,632,227

UNITED STATES PATENT OFFICE 2,632,227

METHOD AND APPARATUS FOR THE RELEASE OF CERAMIC WARE FROM POROUS MOLDS

Richard E. Steele, Columbus, and John F. Bryer, Wellsville, Ohio, assignors to Ram, Inc., Detroit, Mich., a corporation of Michigan Application January 12, 1951, Serial No. 205,694

18 Claims. (Cl. 25—129)

1

This invention relates to the pressing of plastic clay in the formation of ceramic ware and more particularly to the release of the ware from porous molds after pressing.

The most widely used method of shaping plastic clay bodies in the manufacture of ceramic ware has been to shape the plastic clay on an absorbent mold, usually constructed of plaster of Paris. The mold absorbs moisture from the clay which reduces the adhesion of the clay body to the mold and upon continued shrinkage of the ware during drying, the shaped clay object frees itself from the mold. This procedure is rather slow and requires a large number of molds for the drying operation. Moreover, after the formed ware has been removed from the mold, the mold must be dried carefully before it can be used again.

When the ware is shaped by pressing plastic clay between two cooperable porous molds, the problem of releasing the ware from the molds is aggravated. In an effort to eliminate many of the problems, a method and apparatus for releasing the formed ware from the molds by passing a fluid through the porous mold to the ware have been developed. The release of ware from the mold by means of fluid pressure encounters difficulty resulting from the short circuiting of fluid through the mold whereby a large amount of the fluid is directed against parts of the ware and very little fluid pressure is exerted against other parts of the surface of the ware which causes deformation of the soft, fragile ware. If air is used as a fluid to release the ware, the short circuiting will also carry relatively large amounts of water from the mold and dislodge particles from the surface of the ware on which the water is directed. The uneven adhesion of the ware to the mold because of difference in moisture content, or other reasons, aggravate the short circuiting difficulties. Finally, the difference in thickness of various parts of the ware may even result in bending of the ware, which is in a fragile semi-plastic condition as it is released.

The difficulties encountered in the fluid release of pressed ware from porous molds have been overcome to a large extent by the invention described in application Serial No. 734,174 of A. R. Blackburn and Richard E. Steele, filed March 12, 1947 entitled Method and Apparatus for Making Ware now Patent No. 2,584,109. This invention consists essentially in the very careful spacing and location of conduits supplying the releasing fluid within the mold whereby the release of the pressed ware is obtained without substantial distortion or disturbing the internal structure of the

2 clay body. The careful spacing and location of the conduits supplying the releasing fluid can only be obtained by extensive experimentation toward the proper design of the molds.

It is an object of this invention to provide a method for the separation of pressed clay bodies from the faces of cooperating molds used in the pressing of clay bodies with a minimum of disturbance of the internal structure of the clay body.

A further object of this invention is to provide a method for the release of the pressed ware from the entire surface of each of the cooperating molds employed in the pressing of the ware substantially instantaneously.

Another object of this invention is to eliminate the necessity of extensive experimentation in the design of molds for ware of different shapes and sizes.

Another object of this invention is to provide a method for the release of pressed clay bodies from cooperable molds in which variations in adherence of the clay to the mold are minimized prior to separation of the cooperable molds.

A further object of this invention is to provide a method for the release of pressed clay wire from cooperable porous molds by means of fluid pressure exerted through the mold against the ware wherein the mold provides support of the ware while adhesive forces between the ware and the molds are reduced.

Still another object of this invention is to provide a method for the release of pressed clay ware from cooperable molds by means of fluid pressure passed through the mold to the surface of the ware wherein short circuiting of the fluid pressure is minimized.

It is also an object of this invention to provide a method of releasing ceramic ware from porous molds in which the ware has been pressed by first exerting a fluid pressure against the ware insufficient to completely release the ware from the mold while the ware is urged against the mold by a larger opposing force pressure and then exerting an increased net force against the ware by means of fluid pressure to complete the separation of the ware.

With these and other objects in view, as will become apparent in the following detailed description, this invention resides in a method and apparatus for the release of pressed clay ware from cooperable porous molds by passing a releasing fluid through one of the molds while the molds are in a closed position to completely release the ware from that mold and exerting a reduced fluid pressure through the other mold against the ware to partially release the ware from that mold, and then exerting sufficient pressure through the second mold after the molds have been opened to complete the release of the ware.

In the drawings:

Figure 2 is a vertical sectional view illustrating the position of the ware in the closed mold, after the initial application of the releasing fluid pressure to separate the ware from one of the molds.

Figure 3 is a vertical sectional view illustrating the mold in the open position ready for the final release of the ware from the upper mold body.

Figure 1:
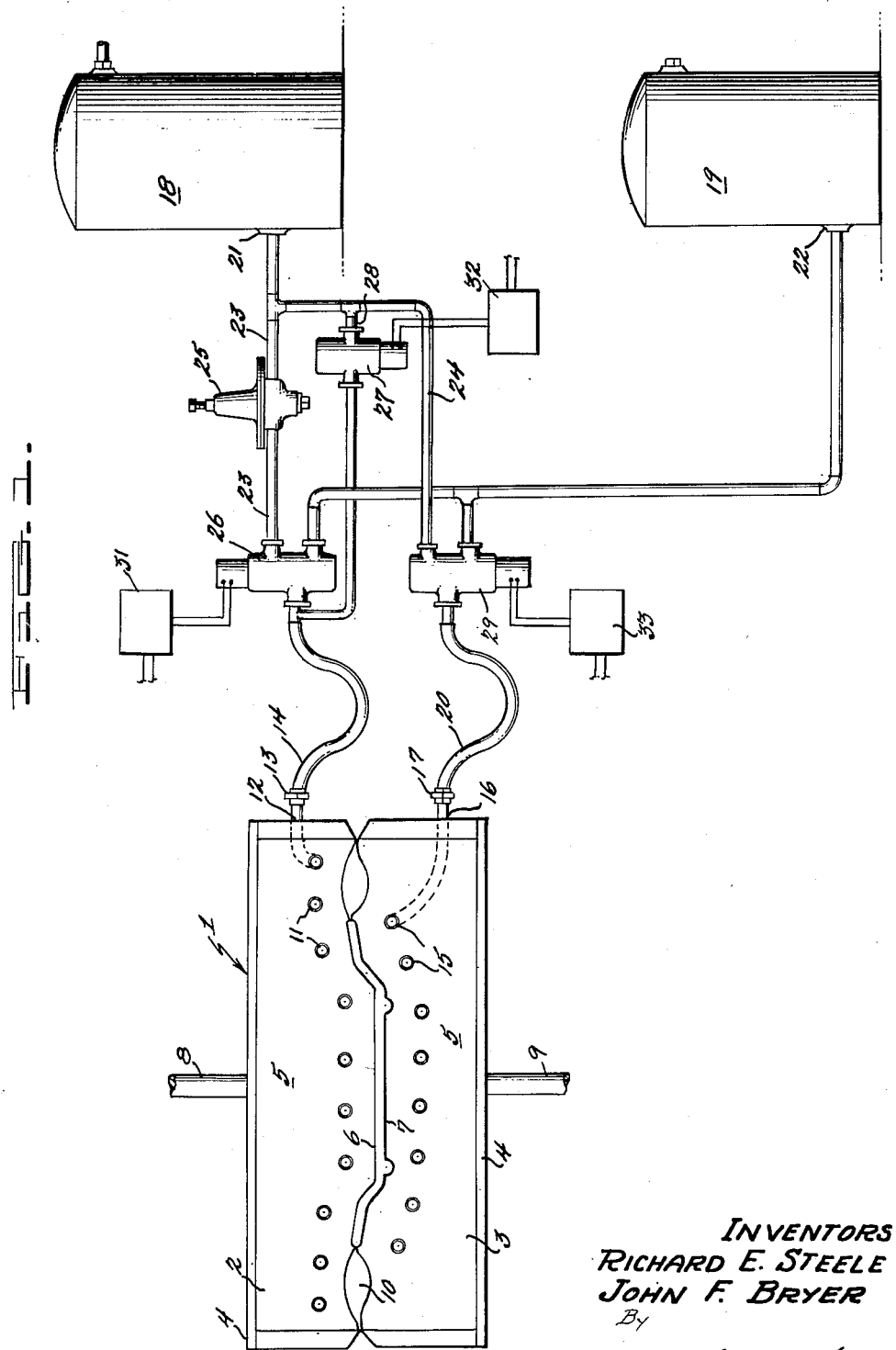
Figure 1 is a diagrammatic view, partly in vertical section, illustrating a pair of cooperable molds in closed position at the completion of the pressing of the ware to form a clay object of the desired shape with the means for passing a releasing fluid through the molds.

In the following description of this invention, reference will be made to a method in which the ware is formed in a pressing operation employing top and bottom cooperable molds and the ware is first completely released from the bottom of the cooperable molds at which time the ware is only partially released from the top mold. It is to be understood that the invention is described in this manner only for purposes of illustration and that the ware could be removed first from the top mold and finally from the bottom mold, or the molds could be supported with the molds separable along a vertical, or even sloping line. In most instances, it will be preferable to release the ware first from the bottom mold and then from the top mold in order to facilitate transportation of the ware on the top mold after the cooperable molds have been opened. Throughout the description of the invention, the term "ware" refers to the clay body after it has been shaped to the desired form by pressing between cooperable porous molds.

Similarly, a modification of this invention will be described in which the fluid pressure is exerted by air which is used as a fluid releasing medium. In the specification and claims of this invention, the term "releasing fluid" includes water, oil, or other materials normally accepted meaning of the term "fluid" as well as air. In most instances, in the manufacture of ceramic ware, it will be preferable to use air, which may be heated but is preferably at room temperature, as a source of fluid pressure in order to avoid contamination or undue wetting of the porous molds and formed clay objects.

Following the pressing of the plastic clay within the molds to form the ware of the desired shape, the ware is released from the molds according to this invention by the application of fluid pressure from within the bottom mold against the surface of the ware to completely separate the ware from that mold while the molds are in the closed position. While the molds are still in the closed position, fluid pressure is also directed from within the top porous mold against the opposite surface of the ware to partly release the ware from that mold face. The partial release decreases the adherence of the formed ware to the mold face, but leaves the ware adhering to the top mold face with sufficient adhesion for the ware to remain upon that mold as the cooperable molds are separated from the closed position.

It will be appreciated that the introduction of the fluid pressure from the molds against the surface of the ware while the molds are in a closed position will result in a substantially uniform pressure being exerted against the face of the ware because of the inherent property of fluids within a confined space seeking a uniform pressure. The fluid pressure will not become uniform in the two molds, however, because the mold will not be left in the closed position for a sufficient period after the application of pressure for equilibrium to be obtained. Any movement of the ware from the face of the molds while the molds are in the closed position while sufficient to completely release the ware from one of the molds will be extremely limited and the support of the other face of the mold efficiently prevents any bending or distortion of the ware. Final separation of the ware from the top mold is accomplished by a second surge of fluid pressure through the mold, after separation of the cooperable molds, sufficient to complete the separation of the ware.

Partial release from the top mold and complete release from the bottom may be obtained by introducing the releasing fluid into the top mold at a pressure lower than that at which it is introduced into the other mold. In this manner, a greater force is exerted against the lower face of the ware than against the upper and the ware is held against the face of the top mold even though the releasing fluid has decreased the adhesive forces holding the ware to the face of that mold. Another method of obtaining partial release from one mold is to introduce the releasing fluid into both sections of the mold at the same pressure but for a longer period in the bottom mold than in the top. This will result in a greater force exerted between the face of the bottom mold and the surface of the ware than against the top mold. Either method probably has the net result of applying a higher fluid pressure against the bottom surface of the ware at the time the molds are separated.

It is believed that the mechanism of the release of the ware from the cooperable molds is probably according to the following principles. The application of the releasing pressure fluid to the top and bottom molds while those molds are closed, partially releases ware from the top mold section. This partial release is very uniform because of the molds being closed and the tendency to obtain a uniform fluid pressure throughout the closed mold. When the procedure of applying equal inlet fluid pressure to the mold, but to the bottom mold for a longer period, is employed, it is quite likely that the ware is actually released from both the top and bottom molds and is made to re-adhere to the top mold by the pressure on the lower mold after the pressure has been cut off of the top mold. Perhaps the surge of air upon the aplication of pressure to the top mold forces some water from the mold to the surface and the increased water content provides some capillary force holding the ware against the top mold section when the greater pressure on the lower surface of the ware forces it back against the top mold, even though the ware was completely released therefrom a short period earlier. Whatever the mechanism of the release of the ware from the mold, the application of the fluid pressure through the mold renders the ware non-adhering to the mold and permits release of the ware from the mold without distortion, as herein described.

When the mold sections are separated, the condition of the top mold is such that it is flooded or saturated with the releasing fluid under a superatmospheric pressure. With the top mold section in this condition, it is only necessary to introduce a relatively small surge of air to the mold fluid under pressure and this pressure is immediately and uniformly exerted against the surface of the ware for complete release.

Referring to Figure 1 of the drawings, a mold, indicated generally by reference numeral 1, is shown in cross-section at the end of the pressing operation in which the ware is shaped. The mold 1 consists of a top mold section 2 and a bottom mold section 3. Each of the mold sections consists of an outer shell 4 filled with a suitable porous material 5 which will ordinarily be plaster of Paris. The faces 6 and 7 of the top mold section 2 and bottom mold section 3 are given the desired shape for the formation of the ware. The top mold section 2 is mounted on a connecting rod 8 and the bottom mold section is connected on a connecting rod 9 for axial movement of the sections towards each other for the pressing of the clay and the subsequent separation of the mold sections. Ordinarily gutters or rickets 10 will be provided to receive the excess clay during the pressing operation.

The mechanism for introducing the releasing fluid into the top mold section 2 may consist of a series of perforated conduits 11 in the top mold section 2 imbedded in the plaster of Paris and adapted to distribute the releasing fluid throughout the porous mold. The shell 4 prevents flow of the releasing fluid away from the face 6 of the mold section 2. The perforated conduits 11 are connected with an extension 12 which passes through the shell 4 for connection by means of a coupling 13 with a flexible line 14. Similar perforated conduits 15 are located within the plaster of Paris 5 in the lower mold section 3 and are connected with an extension 16 for connection with a coupling 17. The perforated conduits 11 and 15 are merely one preferred means for introducing the releasing fluid into the porous mold. In some instances it may be preferable to provide a chamber between the shell 4 and the plaster of Paris 5 for the introduction of the releasing fluid into the mold.

The fluid, preferably air, to be passed through perforated conduits 11 and 15 for the release of the ware is stored in a pressure receiver 18 which may be supplied from any suitable source, not shown. In some instances, it will be desirable to maintain a vacuum on the perforated conduits 11 and 15 during the pressing of the ware to aid in the removal of moisture from the ware and mold, and, for this reason, a vacuum receiver 19 may be provided. The pressure receiver 18 and vacuum receiver 19 are provided with outlets 21 and 22, respectively. The outlet 21 is connected through lines 23 and 24 and flexible lines 14 and 20 with the couplings 13 and 17, respectively.

A reducer 25 for control of the pressure delivered through line 23 to extension 12 at a value lower than the pressure in receiver 18 is positioned in line 23. Between the pressure reducer 25 and coupling 13, is a three-way valve 26 for control of flow of the air through line 23. One port of the three-way valve 26 is connected with the outlet 22 of the vacuum receiver 19, one port is connected through line 23 with outlet 21, and the other port is connected with the flexible line 14 in a manner to permit flow between either receiver and the line 14 but not between each other. Valve 26 is preferably of the solenoid actuated type for control of its operation may be controlled to allow flow between either receiver 18 or 19 and line 14 or close the outlet of the valve and prevent any flow through the valve.

A two-way solenoid valve 27 is connected in a line 28 directly between the outlet 21 and flexible line 14 for the application of high pressure to the top mold 2 for the final or complete release of the shaped ware from that mold. A second three-way solenoid operated valve 29 is positioned in line 24 for control of the flow of fluid therethrough to the bottom mold section 3. As in the case of three-way valve 26, one port of valve 29 is connected to outlet 21 of the pressure receiver 18, one port is connected to the outlet 22 of the vacuum receiver 19, and one port to the line 20. The passages in valve 29 are such that either receiver may be in communication with line 20, but no flow between the receivers is possible.

Each of the valves 26, 27, and 29 is provided with a timer illustrated diagrammatically and indicated by reference numerals 31, 32, and 33 respectively. Timers 31, 32, and 33 may be of any conventional type for the control of the current to the solenoids of the valves 26, 27, and 29 for control of the operation of those valves. Obviously, other timing mechanism, such as cam driven connecting rods directly linked with the stems of valves 26, 27, and 29 could be used to control the application of pressure or vacuum to the molds.

For illustration of the cycle normally followed by the apparatus, suppose a bat of clay has been placed on the bottom mold and the molds have been moved to the closed position. During the clay pressing period, valve 27 will be closed and valves 26 and 29 opened to place the molds in communication with the vacuum receiver 19. After the pressing operation, timer 31 will operate valve 26 to place the top mold 2 in communication with the outlet of the pressure reducing valve 25 for the application of low pressure to the top mold for partial release of the ware from the mold. Meanwhile timer 33 has operated valve 29 to allow flow of air under high pressure directly from receiver 18 to the bottom mold 3 for complete release of the ware from that mold. Valve 27 remains closed while the mold is in the closed position. The fluid flows through the face of the mold and exerts a pressure between the face of the mold and the ware to release the ware from the mold. The pressure exerted by the fluid in the bottom half of the mold is sufficiently high to completely release the ware from the face of that mold and a fluid film 34, greatly exaggerated in thickness in Figure 2, is formed between the ware and the face of the mold.

The reduced pressure in the top mold section 2 resulting from pressure reducer 25 is not sufficient to completely release the ware from the face of that mold. Even if the pressure in the top mold section were sufficient to release the ware, the greater pressure exerted by the fluid against the lower face of the ware would effectively hold the ware against the face of the top mold section. It is possible that some areas on the top surface of the ware will be released from the mold and these areas have been shown in a greatly exaggerated degree at 35 and 36 in Figure 2. The inability of the fluid to escape from the closed molds results in a substantially uniform fluid pressure being exerted against the lower surface of the ware and a substantially uniform, but lower, fluid pressure being exerted against the upper surface of the ware. In this manner, the flow of a relatively large volume of air over any section of the ware is avoided and short circuiting of the releasing fluid is eliminated.

On separating the molds 2 and 3, valve 26 will be closed while valve 29 may remain open to purge the bottom mold of moisture and other foreign substances which may have entered the mold during the pressing operation. The ware adheres to the top mold 2 which may be transferred to a station or conveyor for further processing. At the predetermined time, governed by the setting of the timer, timer 32 opens the valve 27 and thus introduces air under high pressure into the top mold. The porous material 5 forming the mold is saturated or flooded with the fluid used for pressure release and a slight "bump" or surge of the pressure release fluid after separation of the molds is sufficient to completely separate the ware from the top mold section. The flooding of the porous material in the mold causes any slight surge of the releasing fluid to transmit pressure immediately against the ware and thereby avoids channeling of the fluid through the porous mold and the resultant short circuiting which was encountered with the methods of release heretofore available.

In some instances, it may be desirable to eliminate the pressure reducer 25 and obtain the difference in pressure against the surface of the ware within the mold while the molds are closed by a difference in the time of applying fluid pressure on the two mold sections. Even when pressure reducer 25 is used, it may not be desirable to allow flow of the low pressure air into the top mold during the entire pressure release period. This may be accomplished by suitable selection and setting of the timers. In any event, the net effect is probably the same in that a difference in pressures on the upper and lower surfaces of the ware exists prior to opening of the molds.

While this invention has been described in detail with respect to a particular modification of the invention, it is to be understood that the concept of this invention is not limited to those details, but is determined by the scope of the appended claims.

We claim:

1. In the pressre formation of ware wherein a bat of plastic clay is pressed to the formed ware between cooperable molds and released therefrom by the application of fluid pressures through the mold bodies across the faces of the molds, the improvement comprising the steps of breaking the bond between the formed ware and the mold face of one mold, impressing fluid pressure across the face of the other mold in less degree than full releasing pressure while the molds are in full pressing position thereby effecting a partial severance of the pressed ware body from the said other mold, moving the cooperable molds from the pressing position to open position with the ware adhering to said other mold, and finally releasing the ware from the said other mold by a second application of fluid pressure after separation of the cooperable molds.

2. In the pressure formation of ware wherein a bat of plastic clay is pressed between cooperable molds and released therefrom by the application of fluid pressure through the mold bodies across the faces of the molds, the improvement comprising the steps of breaking the bond between the formed ware and the mold face of the lower mold, impressing fluid pressure across the face of the upper mold in less degree than the full bond breaking pressure required for complete separation while the molds are in pressing position thereby effecting a partial severance of the pressed ware body from the upper mold, separating the two molds to an open position, and separating the ware from the upper mold by a second application of fluid pressure across the face of the upper mold.

3. In the pressure formation of ware wherein a bat of plastic clay is pressed between cooperable molds, one mold being stationary and the second mold being movable from open to closed mold positions, and wherein the ware is forced from forming faces of the molds by the application of fluid pressure across the faces of the molds, the steps of passing a fluid under pressure through the mold and across the mold face of the stationary mold to effect even breaking of the bond between the mold face and the ware, directing a fluid pressure of less degree across the mold face of the movable mold to effect even partial release of ware therefrom while the molds are in the closed position, then moving the molds to open position with the pressed ware retained on the movable mold, and directing fluid pressure through the movable mold to complete the release of ware.

4. In the method of claim 3, the fluid employed for the exertion of fluid pressure being air.

5. In the pressure formation of ware wherein a bat of plastic clay is pressed between cooperable molds, one mold being stationary and the second mold being movable from open to closed mold positions, and wherein the ware is forced from forming faces of the molds by the application of fluid pressure across the faces of the molds, the steps of passing a fluid under pressure through the mold and across the mold face of the movable mold to effect even breaking of the bond between the mold face and the ware, directing fluid pressure of less degree across the mold face of the stationary mold to effect even partial release of ware therefrom while the molds are in the closed position, then moving the molds to open position with the pressed ware retained in the stationary mold, and directing fluid pressure to the stationary mold to enable the withdrawal of ware from the said stationary mold.

6. In the method described in claim 5, the fluid employed for the exertion of fluid pressure being air.

7. In the pressure formation of ware using cooperable plaster molds provided with fluid pressure conduits for forming an even blanket of fluid pressures across the mold faces, the steps of applying fluid pressure substantially evenly across the entire face of one mold to break the normal adherence of the pressed ware to the mold face, applying a lower fluid pressure substantially evenly across the entire face of the other mold, and subsequently after separation of the molds from pressing position applying fluid pressure to the said other mold to complete the separation of the ware.

8. In a method of releasing ware from cooperable porous molds in which they have been pressed by applying air pressure through the molds against the ware to break the adhesion between the ware and the molds, the steps of applying air pressure through the molds against the surface of the ware to partially release the ware from one of the molds while the molds are in the closed position, separating the molds, and then again applying air pressure through that mold to complete the release of the ware from the mold.

9. In a method of releasing ware from cooperable porous molds in which they have been pressed by applying fluid pressure through the molds against the ware to break the adhesion between the ware and the molds, the improvement comprising the steps of applying fluid pressure through one of the molds against the face of the ware while the molds are in a closed position to partially release the ware from that mold and flood that mold with fluid under pressure, separating the cooperable molds with the ware adhering to the mold from which it has been partially released, and then applying a surge of fluid pressure through the mold from which the ware is partially released whereby a substantially uniform fluid pressure is exerted against the ware and the entire surface of the ware is substantially simultaneously released from the mold surface.

10. In a method of releasing ware from cooperable porous molds in which the ware has been pressed, the steps of directing fluid pressure through the porous molds against the surface of the ware while the molds are in the closed position to apply a substantially uniform pressure between the face of one mold and the ware to completely release the ware from that mold and a lower substantially uniform pressure between the face of the other mold and the ware to effect a partial separation leaving the ware adhering thereto, separating the molds, transporting the ware on the mold, and then applying additional fluid pressure to the mold with the ware adhering thereto to complete the separation.

11. Apparatus for the release of ware from porous molds in which plastic clay has been pressed to form the ware comprising a source of fluid pressure, conduit means within the porous molds, lines connecting the source of fluid pressure with the conduits within the mold, valve means controlling the flow of fluid from the source of fluid pressure to the conduits, and means operating the valve means to permit a flow of fluid to the conduits after pressing of the ware and while the molds are closed to release the ware from one of the molds and partially release it from the other mold, said means operating the valve means arranged and constructed to allow additional flow through the conduits in the mold from which the ware is partially released after opening of the molds.

12. Apparatus for the release of ware from cooperable porous molds comprising conduit means within the molds, a source of fluid pressure, lines connecting the source of fluid pressure with the conduit, valve means in the lines controlling the flow of fluid therethrough, a pressure reducer in one of the lines constructed and arranged to apply a low pressure through one of the molds and a higher pressure through the other mold, and timing means controlling the operation of the valve means to apply fluid pressure through the molds while the molds are in the closed position whereby the ware is partially released from the mold receiving the reduced fluid pressure and completely released from the other mold.

13. Apparatus for the release of ware from porous molds in which clay bodies have been pressed to form the ware comprising conduit means within the molds, a source of fluid pressure, lines connecting the source of fluid pressure with the conduit means, valve means in the lines for control of the flow of fluid therethrough, and timing means operating the valve means, said timing means being constructed and arranged to permit flow of fluid to the conduit means following the pressing of the ware while the molds are in a closed position, said timing means allowing flow to one of the molds for a period longer than to the other mold whereby the ware is completely released from one of the molds and partially released from the other mold while the molds are in a closed position.

14. In apparatus for the release of ware from porous molds in which clay has been pressed to form the ware, the improvement comprising means for applying fluid pressure between a face of the ware and one of the molds and a lower fluid pressure between the face of the ware and the other mold while the molds are in a closed position, means for opening the molds whereby the ware adheres to the mold having the lower pressure applied therethrough, and means for applying additional fluid pressure to the mold with the ware adhering thereto to complete the separation of the ware therefrom.

15. A process for the release of ware formed by pressing bats of plastic clay between cooperable permeable molds to the desired shape in which the cooperable molds are in a closed position during the pressing of the bats comprising passing a fluid under pressure through a first one of the molds and against the ware while the molds are in the closed position to render the ware non-adhering to that mold, passing a fluid under pressure through the other mold while the molds are in the closed position, the fluid pressure being passed through the other mold for a shorter period of time than through the first mold whereby the ware is only partially released from said other mold, separating the molds with the ware adhering to said other mold, and then again passing fluid under pressure through said other mold to separate the ware completely from the said other mold.

16. A process for the release of ware formed by pressing bats of plastic clay between cooperable permeable molds to the desired shape in which the cooperable molds are in a closed position during the pressing of the bats, comprising passing a fluid under pressure through a first one of the molds and against the ware while the molds are in the closed position to exert a force between the ware and the mold rendering the ware non-adhering to that mold, passing a fluid under pressure through the other mold while the molds are in the closed position to exert a force of less degree between the ware and said other mold than between the ware and the first mold to partially release the ware from said other mold, separating the molds with the ware adhering to said other mold, and then again passing fluid under pressure through said other mold to separate the ware completely from said other mold.

17. A process for the release of ware formed by pressing bats of plastic clay between cooperable permeable molds to the desired shape in which the cooperable molds are in a closed position during the pressing of the bats comprising passing a fluid under pressure through a first one of the cooperable molds and against the ware while the molds are in the closed position to render the ware non-adhering to that mold, passing a fluid under a lower pressure through the other mold while the molds are in the closed position to partially release the ware from said other mold, separating the molds with the ware adhering to said other mold, and then again passing fluid under pressure through said other mold to separate the ware completely from said other mold.

18. A process for the release of ware formed by pressing bats of plastic clay between cooperable permeable molds to the desired shape in which the cooperable molds are in a closed position during the pressing of the bats, comprising passing air under pressure through a first one of the molds and against the ware while the molds are in the closed position to exert a force between the ware and the mold rendering the ware non-adhering to that mold, passing air under pressure through the other mold while the molds are in the closed position to exert a force of less degree between the ware and said other mold and between the ware and the first mold to partially release the ware from said other mold, separating the molds with the ware adhering to said other mold, and then again passing air under pressure through said other mold to separate the ware completely from said other mold.

RICHARD E. STEELE.
JOHN F. BRYER.

REFERENCES CITED

The following references are of record in the file of this patent:

UNITED STATES PATENTS

| Number | Name | Date |
|---|---|---|
| 1,717,996 | Moore, Jr. | June 18, 1929 |
| 2,331,000 | Shaefer | Oct. 5, 1943 |